United States Patent
Kameyama et al.

(10) Patent No.: US 7,093,163 B2
(45) Date of Patent: Aug. 15, 2006

(54) PROCESSING TAKEOVER METHOD IN MULTIPLE COMPUTER SYSTEM

(75) Inventors: Shin Kameyama, Kodaira (JP); Toshiaki Tarui, Sagamihara (JP); Yutaka Yoshimura, Hadano (JP)

(73) Assignee: Hitachi, Ltd., Tokyo (JP)

( * ) Notice: Subject to any disclaimer, the term of this patent is extended or adjusted under 35 U.S.C. 154(b) by 937 days.

(21) Appl. No.: 10/217,475

(22) Filed: Aug. 14, 2002

(65) Prior Publication Data

US 2003/0163735 A1    Aug. 28, 2003

(30) Foreign Application Priority Data

Feb. 26, 2002   (JP)   ............. P2002-048940

(51) Int. Cl.
*G06F 11/00*   (2006.01)
*G06F 21/00*   (2006.01)
(52) U.S. Cl. ............. 714/21; 714/13; 714/20; 726/23; 726/26
(58) Field of Classification Search ............ 714/21
See application file for complete search history.

(56) References Cited

U.S. PATENT DOCUMENTS

| | | | | |
|---|---|---|---|---|
| 5,440,723 A | * | 8/1995 | Arnold et al. | 714/2 |
| 5,919,257 A | * | 7/1999 | Trostle | 726/22 |
| 6,016,553 A | * | 1/2000 | Schneider et al. | 714/21 |
| 6,535,998 B1 | * | 3/2003 | Cabrera et al. | 714/15 |
| 6,546,500 B1 | * | 4/2003 | Miyamoto | 714/6 |
| 6,799,258 B1 | * | 9/2004 | Linde | 711/162 |
| 2002/0069363 A1 | * | 6/2002 | Winburn | 713/200 |
| 2004/0019878 A1 | * | 1/2004 | Kotnur et al. | 717/120 |

FOREIGN PATENT DOCUMENTS

| | | |
|---|---|---|
| JP | 9-231185 | 2/1996 |
| JP | 11-194952 | 1/1998 |

OTHER PUBLICATIONS

Gene H. Kim and Eugene H. Spafford, "The Design and Implementation of Tripwire: A File System Integrity Checker", 1994, Association of Computing Machinery, pp. 18-29.

* cited by examiner

*Primary Examiner*—Scott Baderman
*Assistant Examiner*—Gabriel L. Chu
(74) *Attorney, Agent, or Firm*—Reed Smith LLP; Stanley P. Fisher, Esq.; Juan Carlos A. Marquez, Esq.

(57) ABSTRACT

In a data center, when a server is disconnected from the Internet because of illegal manipulation of a file, valid files (not manipulated) are copied to a standby server and the processing is resumed after a short period of disconnection. According to the invention, a control program P10 performs manipulation checks for all files listed in a manipulation checklist. If any of them is manipulated, it issues a request to disconnect from the external network and a request to assign a standby server to a control program P20 of a management server. Upon receipt of a disconnection completion signal and the address of a standby server b0, the control program P10 copies valid files (not manipulated) to the standby server b0, and for invalid files, requests the copies of their backup files. After finishing copying, the management server connects the standby server b0 to the external network to resume processing.

20 Claims, 6 Drawing Sheets

FIG. 9

TAMPERING CHECK LIST     T10

| USER NAME | FILE | CHECK RESULT | BACKUP DESTINATION |
|---|---|---|---|
| A | f00 | 0 | g00 |
| A | f01 | 1 | g01 |
| A | f02 | 0 | g02 |
| B | f10 | 0 | g10 |
| B | f11 | 0 | g11 |
| B | f12 | 0 | g12 |
| C | f20 | 0 | g20 |
| C | f21 | 0 | g21 |
| C | f22 | 0 | g22 |

PROCESSING TAKEOVER METHOD IN MULTIPLE COMPUTER SYSTEM

BACKGROUND OF THE INVENTION

1. Field of the Invention

The present invention relates to a multiple computer system comprising active computers and standby computers connected via a network, and more particularly to the continuation of services in a case where the active computers are disconnected from the Internet due to illegal access.

2. Description of the Prior Art

There are increasing businesses outsourcing their operations of an intra-enterprise information system and corporation Web page management to ASPs (application service providers) to reduce information management costs. The ASPs, in most cases, further outsource the operation management of their computer resources to data centers. Outsourcing models are broadly classified into housing and hosting. In the housing model, computers are owned by users and the data center agencies provide space for installing the computers, including utilities such as power, air conditioning, and connection to the Internet. Although the users themselves generally operate and manage the computers, some agencies provide security monitoring. On the other hand, in the hosting model, agencies provide computers in addition to the above-described computer installation and operating environments, and support computer operation and management, security monitoring, and the like. A shared hosting model is also available in which one computer is shared by tens or hundreds of users.

By the models, computers within a data center, which are connected with the Internet to provide a variety of services, are under the risk of illegal access. Particularly, protection and measures are important against virus contamination and attack on the OS (operating system) and applications. Once virus contamination or illegal invasion has occurred, a large number of users might be damaged, and other external computer resources might also be damaged through the Internet. Therefore, if illegal invasion is detected, it is desired that a concerned computer is to be immediately disconnected from the Internet. By disconnecting the computer from the Internet, a trace of the illegal access can be maintained within the computer thereby helping to locate illegal access routes and means and preventing any reoccurrence. Software for checking for illegal access, particularly contents manipulation of Web pages and the like (proceeding of the $2^{nd}$ ACM Conference on Computer and Communications Security, "The Design and Implementation of Tripwire: A File System Integrity Checker"), such as the software programs sold under the trademark TRIPWIRE®, is available. TRIPWIRE® programs put status of directories and files of a computer into a database in advance at a reliable point, and detects file additions, changes, and deletions by consulting the database. If illegal access occurs, the changed portions can be located and recovery operation can be performed according to information of the changed portions.

If a file manipulation is detected and a computer is disconnected from the Internet, services to users having used the computer are stopped. In the case of the shared hosting model, this will exert a great influence because services to all users having used the computer are stopped. Also, it creates a problem that some users become unable to use other files because of manipulations of specific files. In such a case, if a system is dually configured by active computers and standby computers, even if services of the active computers are stopped, the services can be continued by the standby computers.

Methods for configuring dual systems include a method for copying data of active computers to standby computers in real time, and a method of periodically backing up data of active computers to backup apparatuses. In the case of the former, since manipulated files are also copied, services cannot be continued in the standby computers, and a large space to install the computers and high costs are required. On the other hand, in the case of the latter, costs can be reduced by assigning one backup apparatus to plural active computers. If a time interval of backup operations is sufficiently long, files backed up can be subjected to manipulation checks for the duration of the interval such that file validity can be guaranteed upon restoration from the backup. However, since backup operation puts a high load on computers and networks, it cannot be performed frequently, usually about once a day. Consequently, since the contents of files restored from the backup apparatuses are often out of date, there is also a problem in service continuation by use of the restored files.

SUMMARY OF THE INVENTION

An object of the present invention is to take disconnection action for preventing influence of illegal invasion or the like from spreading thereby minimizing its influence on services. More specifically, when file manipulation is detected, valid files are differentiated and copied to standby computers as the latest files thereby enabling service continuation and reducing a service stop period. Another object of the present invention is to make full use of backup files.

The present invention, when detecting illegal manipulations of files, disconnects the tampered active computer(s) operating at that point from the external network, such as the Internet, copies files determined as valid at that point are sent from the active computer(s) to standby computer(s), and for files detected to be manipulated, copies their backup files are sent to the standby computers such that the processing is continued by the standby computers.

In typical embodiments of the present invention, active computers have a manipulation checklist describing files managed therein that are to be checked. The manipulation checklist is composed of file groups each consisting of one or more files. For example, if computers are for shared hosting, files owned by users are grouped on a user basis. Functionally, the file groups each constitute Web pages. The active computers perform manipulation checks for all files registered in the manipulation checklist and record the results of the checks in the manipulation checklist. The active computers have a control program that refers to the manipulation checklist. If any of files is manipulated, it makes a request to disconnect the respective active computer from the external network, and copies files determined to be not manipulated from the manipulation checklist to the standby computers.

More specifically, the above-described request to disconnect from the external network is issued to a management computer, which, upon receipt of the request, disconnects the tampered active computer from the external network. Moreover, the management computer has a correspondence list associating active computers with standby computers. Upon receipt of the above-described disconnection request, the management computer notifies an issuing active computer of a corresponding standby computer. Upon receipt of this notification, the active computer copies the valid files to the standby computer. Meanwhile, the back-up files of tampered files are also copied to the standby computer. The termination of copying of all files is reported to the management computer, which connects the standby computer to the external network.

In a typical example, a differentiation is made not in units of individual files but in units of the above-described users to execute the coping based upon the user groups. In other words, if any of files owned by a certain user is determined to be manipulated, for all files owned by the user, instead of copying the valid files from an active computer to a standby computer, their backup files are copied to the standby computer.

In this way, the standby computers receive the latest files of the valid files to continue services, and for the backup files of the manipulated files of a reliable time point.

Other and further objects, features and advantages of the invention will appear more fully from the following description.

BRIEF DESCRIPTION OF THE DRAWINGS

A preferred embodiment of the present invention is illustrated in the accompanying drawings, in which:

FIG. 9 shows configuration data of a table when manipulation is detected by the embodiment.

DETAILED DESCRIPTION OF THE PREFERRED EMBODIMENTS

Hereinafter, an embodiment of the present invention will be described. Although, in this embodiment, plural users share and use one active server, the present invention is also applicable to a case where a single user exclusively uses one active server.

Figure 1:
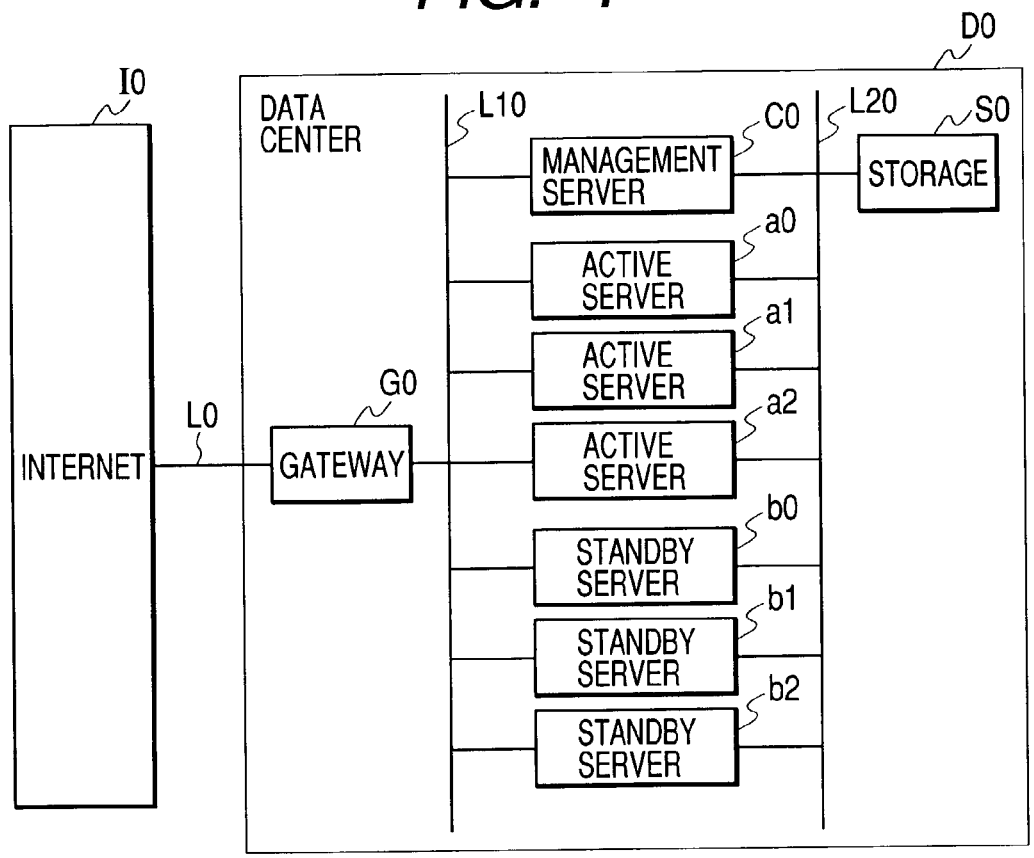
FIG. 1 shows a configuration of a data center according to an embodiment of the present invention.

FIG. 1 shows a configuration of a data center according to an embodiment of the present invention. A data center D0 includes a gateway G0, a management server C0, plural active servers a0, a1, and a2, plural standby servers b0, b1, and b2, and a storage S0. The gateway G0 is connected with the Internet I0 and connected with the above-described servers by an internal network L10. The storage is connected with the above-described servers by the internal network L10. The management server, the active servers, and the standby servers each has a private network address in the data center D0 such that they can communicate with each other. The gateway G0 can block or resume access from the Internet I0.

Figure 2:
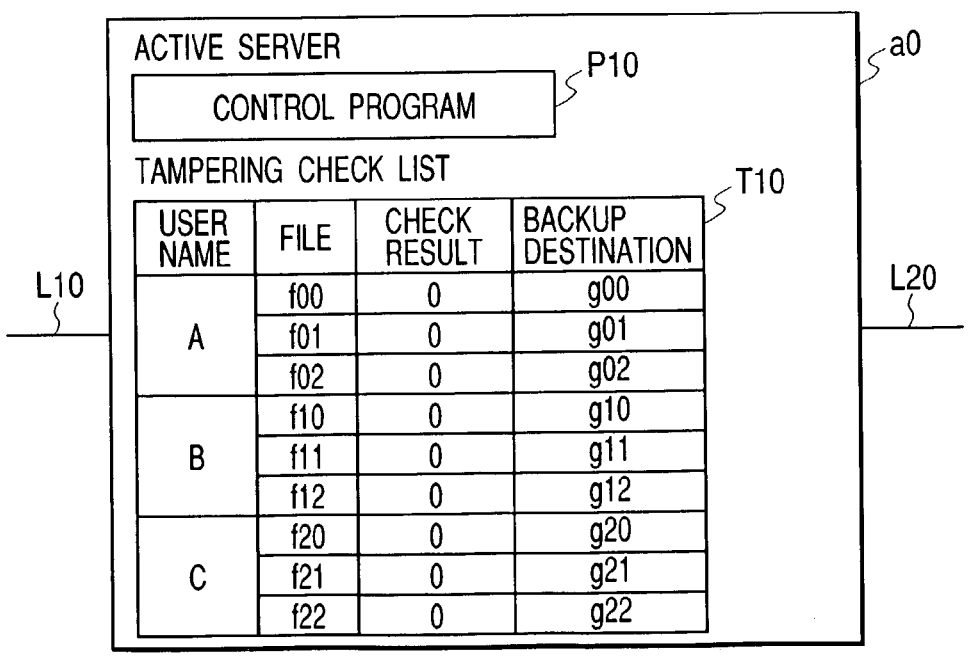
FIG. 2 shows a tampering checklist and a control program of an active server according to the embodiment.

The active server a0 has a control program P10 and a manipulation/tampering checklist as shown in FIG. 2. The other active servers a1 and a2 also have the same configuration. The manipulation checklist includes files subject to a manipulation check. For each of users (A, B, C) sharing the active servers, files (f00 to f02, f10 to f12, f20 to f22) owned by the users are stored in the format of a full path name from a route directory. The manipulation checklist includes fields for recording the result of a manipulation check made on each of the files, and fields for recording backup destinations (g00 to g02, g10 to g12, g20 to g22) of the storage S0 (to which the files each are backed up). The active server a0 periodically backs up corresponding files to backup destinations recorded in the manipulation checklist T10.

Figure 3:
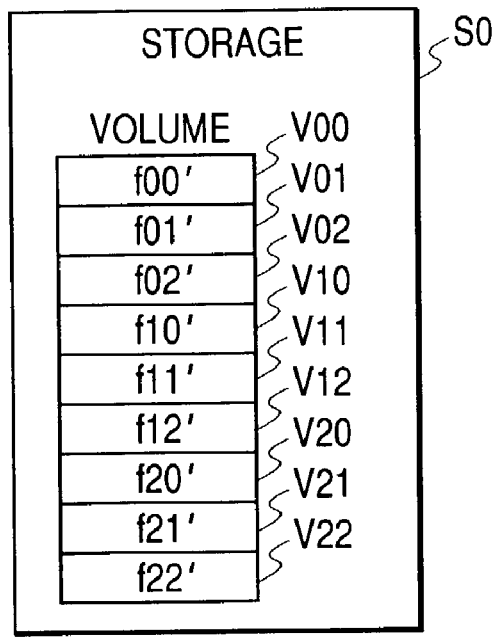
FIG. 3 is a configuration diagram of a storage according to the embodiment.

FIG. 3 shows a state in which the files are backed up. Volumes V00 to V02, V10 to V12, and V20 to V22 of the storage S0 are backup areas of the files f00 to f02, f10 to f12, and f20 to f22, respectively, and are stored as the backup files f'00 to f'02, f'10 to f'12, and f'20 to f'22, respectively.

The control program P10 of FIG. 2 includes a manipulation checking part employing a file system integrity-checking program, such as the TRIPWIRE® programs. The manipulation check execution part performs manipulation checks for all files described in the manipulation checklist T10 in a cycle shorter than a cycle in which the backup files are stored, and reflects check results in the check result fields. In this example, if one file was not manipulated, "0" is set in corresponding check result fields, and if it was manipulated, "1" is set in corresponding check result fields. The control program P10 refers to the check result fields, and if any of the files was manipulated, it requests the management server C0 to disconnect the active server from the Internet I0 and assigns a standby server to resume the processing thereof. Also, the control program P10 refers to the check results, and copies each of files of a user to any standby server if none of them was manipulated. Furthermore, the control program P10 notifies the management server C0 of the backup locations of all files of a user owning a file in which manipulation was detected.

Figure 4:
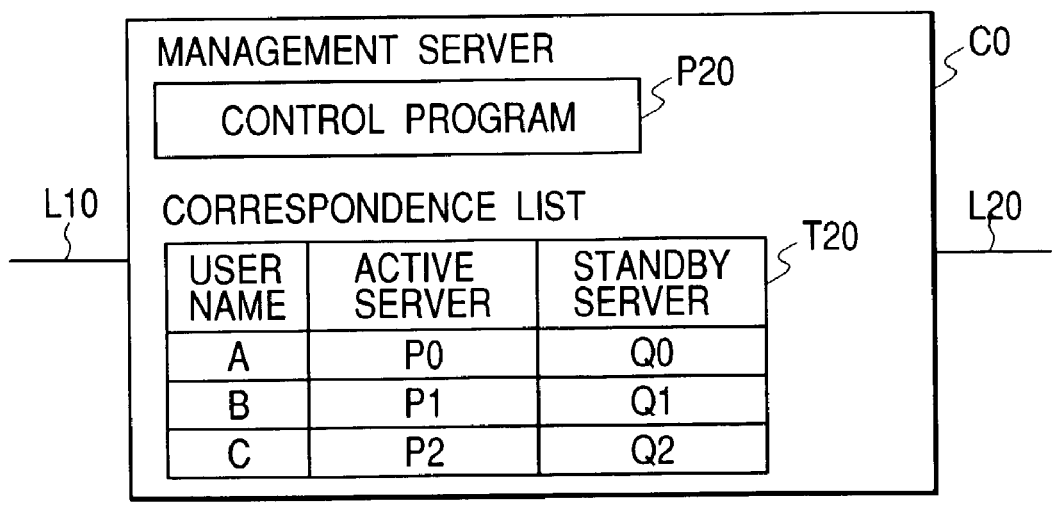
FIG. 4 shows a configuration of a management server according to the embodiment.

FIG. 4 shows an internal configuration of the management server C0. The management server C0 has a correspondence list T20 for associating active servers with standby servers, and the control program P20. The active server fields and the standby server fields of the correspondence list T20 are stored in advance with the network addresses of active servers and standby servers, respectively, thereby providing a correspondence relation. The Control program P20 notifies an active server of a private network address of a standby server assigned to the active server. The control program P20 remotely changes the setting of the gateway G0, disconnects any server from the Internet I0, and connects any server to the Internet I0. The control program P20 copies files stored in backup locations indicated from active servers to standby servers.

Figure 5:
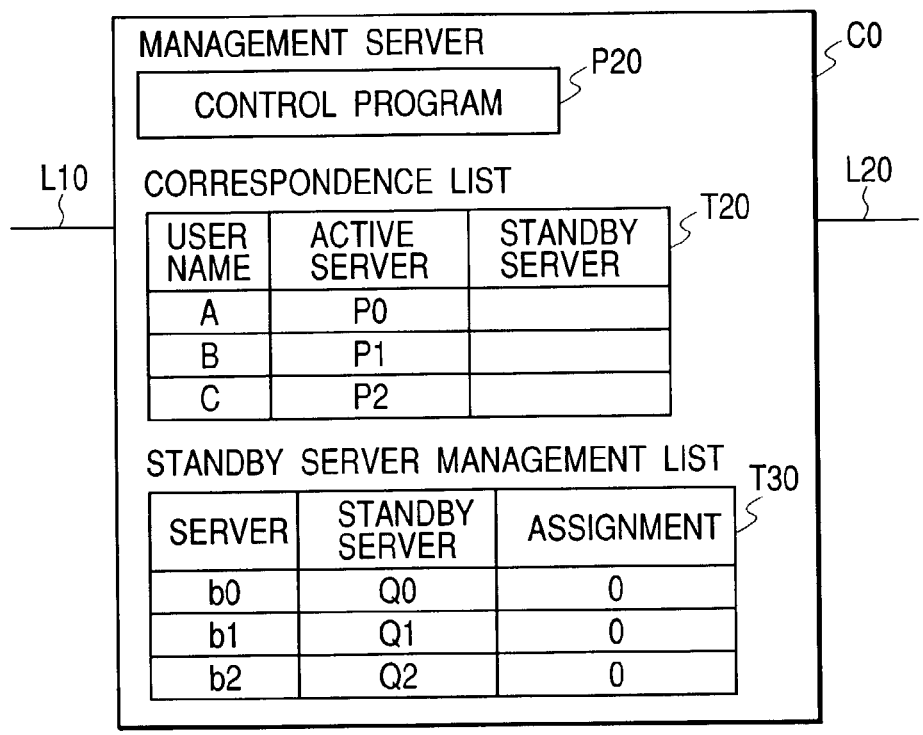
FIG. 5 shows a different configuration of the management server.
Figure 6:
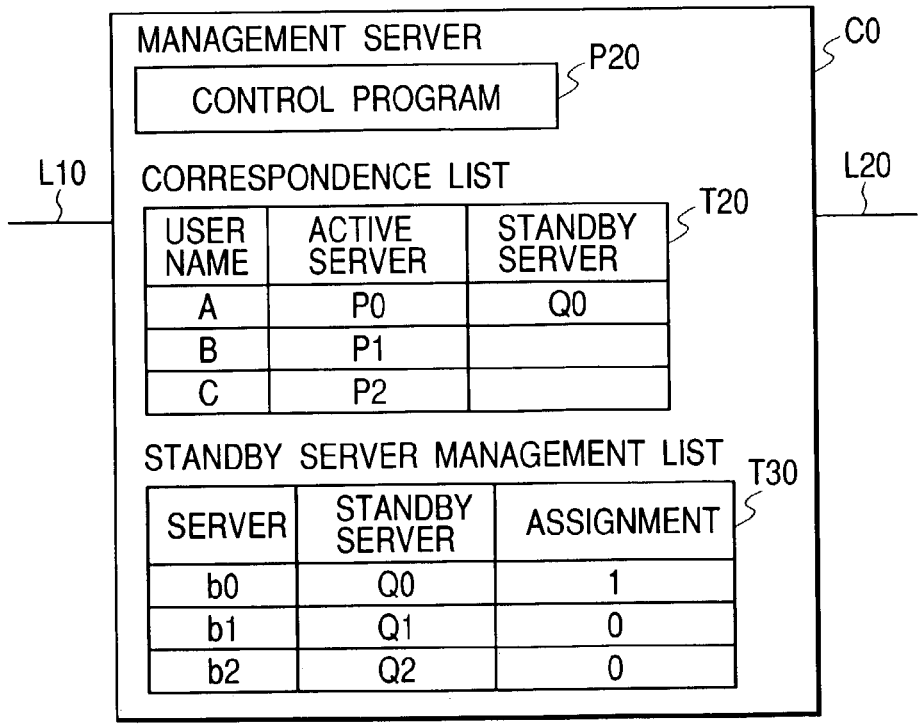
FIG. 6 shows a state transition of the different configuration in FIG. 5.

The management server C0 may also have a different internal configuration as shown in FIG. 5. In this example, a standby server management list T30 manages an assignment status of standby servers, and dynamically associates standby servers not previously assigned to any active servers with active servers. In FIG. 5, for standby servers already assigned, "1" is set in corresponding assignment fields of the standby server management list T30; for standby servers not assigned, "0" is set therein. For active servers not associated with any standby servers, corresponding standby server fields of the correspondence list T20 are blank. When it is determined from the standby server management list T30 that a standby server b1 is assigned to an active server a0, the standby server management list T30 and the correspondence list T20 are updated as shown in FIG. 6. According to such a variation, when an active server is disconnected, since a standby server can be assigned correspondingly, system configuration costs can be reduced in comparison with the embodiment shown in FIG. 4 in which active servers are associated in advance with standby severs.

A control program P20 in FIG. 6, in addition to the same functions as the control program P20 of FIG. 4, decides standby servers to be assigned by referring to the standby server management list T30, and reflects the assignment result in the standby server management list T30 and the correspondence list T20.

Figure 7:
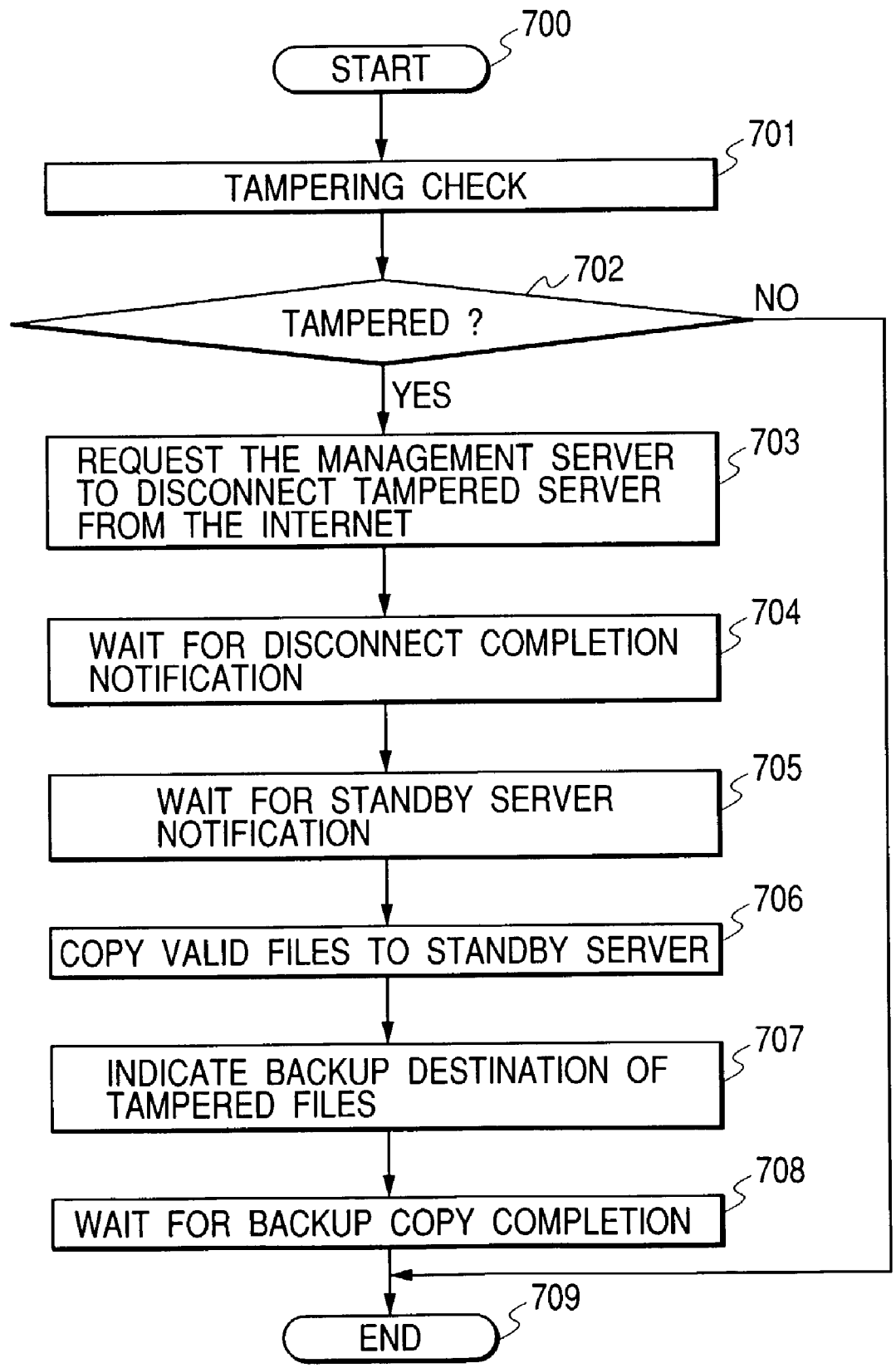
FIG. 7 is a flowchart of processing of a control program of the active server of the embodiment.
Figure 8:
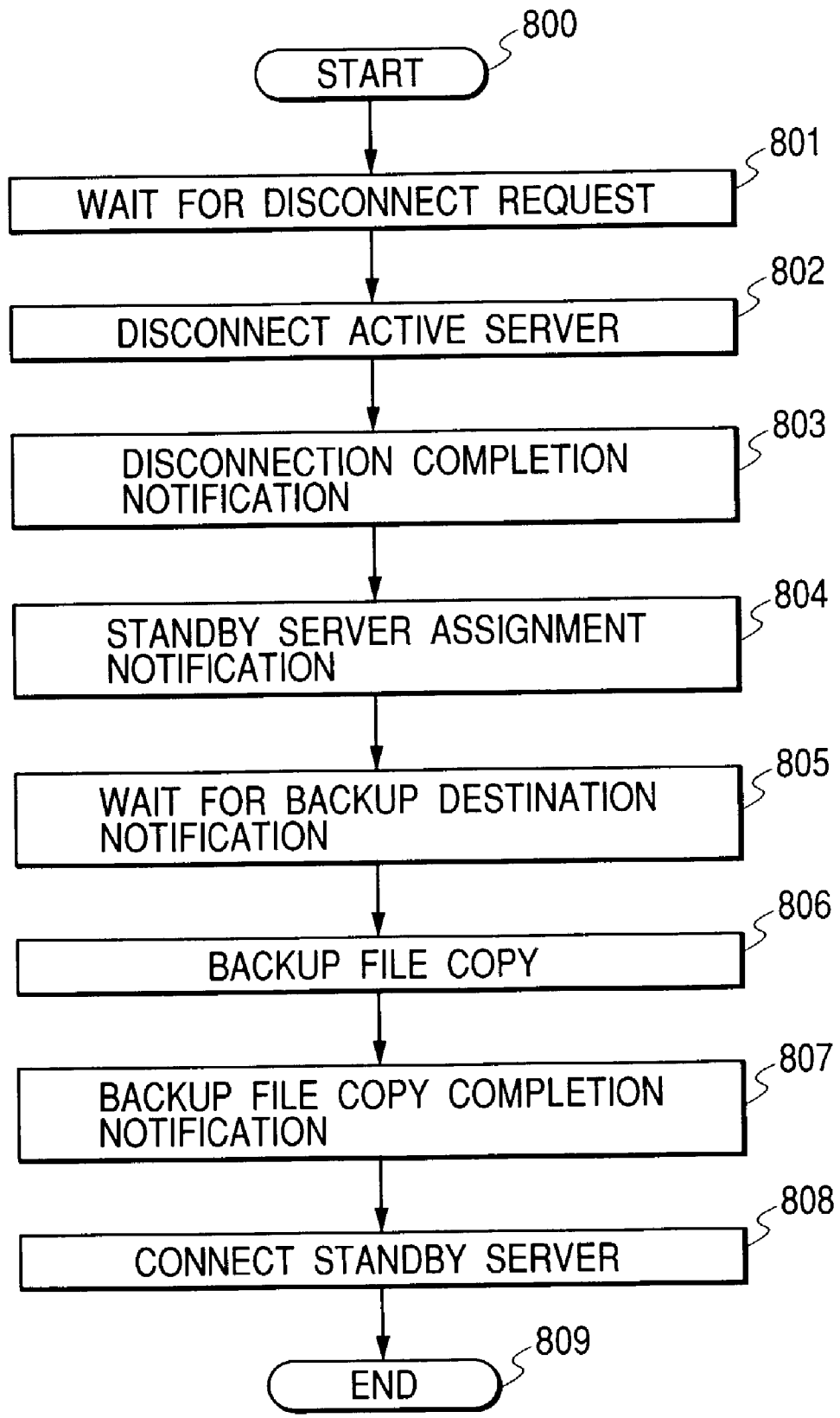
FIG. 8 is a flowchart of processing of a control program of the management server of the embodiment.

FIGS. 7 and 8 show the respective processing flows of the control program P10 and the control program P20. The following description assumes that a standby server b0 is assigned as a substitute for an active server a0, and a file of a user A was manipulated/tampered.

A processing flow of the control program P10 of the active server a0 is described with reference to FIG. 7. As described previously, the control program P10 sequentially performs manipulation checks for all files described in the checklist T10 with the TRIPWIRE® programs, and records the results of the checks in check result fields (step 701). Upon the termination of checking for all files, the control program P10 inspects check results (step 702). If the values of all check result fields are "0", the control program P10 determines that manipulation did not incur, and terminates processing. On the other hand, as shown in FIG. 9, if any of the check result fields is "1", the control program P10 determines that manipulation occurred, and requests the control program P20 of the management server C0 to disconnect the active server a0 from the Internet I0. At this time, the control program P10 notifies the control program P20 of the address P0 of the tampered active server (step 703). Thereafter, the control program PL10 waits for a disconnection completion notification from the control program P20 (step 705), and the address Q0 of the standby server b0 to take over its own processing thereof (to be passed from the control program P20) (705). Upon receipt of the address Q0 of the standby server b0, the control program P10 starts communicating with the address Q0 for an acceptable coping protocol so as to copy valid files f10 to f12 and f20 to f22 (not manipulated files of the User B and User C) to the standby server b0 (step 706). Upon terminating of the file copying, the control program P10 notifies the control program P20 of the backup destinations g00 to g02 of all the files f00 to f02 of the User A (step 707). Thereafter, the control program P10 waits for a backup copy completion notification from the control program P20 (step 708) and terminates processing (step 709).

As has been described above, in this embodiment, full path names of files to be checked are registered in the manipulation checklist. In other words, although a manipulation check is performed on a file basis, a differentiation is made not based upon individual files but based upon users owning the files to decide whether to copy valid files from an active server to a standby server after referring to check results, and whether backup files are copied. In other words, when all files to be checked, owned by an identical user are determined to be not manipulated as a result of manipulation checks, the files are copied to a standby server as valid files. Thereby, even in the case where there is some concern about the precision of detecting illegal manipulation or an execution cycle of the checking, processing can continue without any influence of illegal manipulation.

As an alternative to this embodiment, a differentiation may be made between whether, with mutually related files being grouped, current files are copied to a standby server based upon the resulting file groups to decide whether to copy the backup files. In this case, to the manipulation checklist T10 of FIG. 2, fields containing information indicating which file group an individual file belongs to, are added. Alternatively, in place of file names of the manipulation checklist T10, information for identifying the file groups is recorded. Furthermore, of course, a differentiation can be made based upon whether current files are copied to a standby server in units of individual files identified by full path names to decide whether to copy the backup files.

A processing flow of the control program P20 of the management server C0 is described with reference to FIG. 8. The control program P20 waits for a disconnection request from active servers (step 801). Upon receipt of the address P0 of the active server a0 as a disconnection request notification from the control program P10, the control program P20 recognizes the active server to be disconnected. The control program P20 instructs the gateway G0 to disconnect the active server a0 from the Internet I0. In short, the input of requests to the active server a0 is blocked (step 802). After the disconnection is complete, the control program P20 notifies the control program P10 of disconnection completion (step 803). Thereafter, the control program P20 refers to the correspondence list T20 to obtain the address Q0 of the standby server b0 associated with the active server a0, and passes it to the control program p10 (step 804). Next, the control program P20 waits for the backup destination of a manipulated file (or the backup destinations of all the files of the User A which include the manipulated file) reported from the control program P10 (step 805). Upon the receipt of g00 to g02 from the control program P10, the control program P20 reads backup files f00 to f02 stored in the backup destinations g00 to g02 of the storage S0, starts communicating with the address Q0 for an acceptable coping protocol so as to copy the files to the standby server b0 (step 806). After completion of the file copying, the control program P20 sends a completion notification to the control program P10 (step 807). Next, the control program P20 operates the gateway G0 and switch requests from the active server a0 to the standby server b0 such that subsequent requests from the Internet I0 are processed not in the server a0 but in the sever b0 (step 808). After line switching, the processing standby server is started.

Although the above description has been made of an example that executes procedures for switching services to a standby server when illegal manipulation of a user file is detected by the respective control programs of the active server and a management server, these control programs are not necessarily required to execute all procedures but may be executed in various ways. It is not necessary to copy all backup files of manipulated files to a standby server, but copying only selected specific files to the standby server.

As described, according to the present invention, manipulation check results are recorded for each user. Based on the manipulation check results, the latest valid files are automatically copied to standby servers so as to continue the processing. In a case where a large number of users share the servers, even if a situation occurs in which the servers must be disconnected from the external network because files of some users were manipulated, other users can resume using the servers after a short period of disconnection. Also for the users who suffered the illegal manipulation, recovery can be made in a short time by the standby servers.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for detecting and disconnecting at least one manipulated computer among plural active computers within a multiple computer system thereby continuing processing therein, comprising:

registering files to be subjected to manipulation checks;

performing the manipulation checks for the files and recording results of the manipulation checks;

assigning, if at least one file of one of the active computers is manipulated according to the results of the manipulation checks, at least one computer within the multiple computer system to substitute for the manipulated computer;

notifying the manipulated computer of the assigned computer; and copying valid files determined to be not manipulated from the manipulated computer to the assigned computer and copying a backup file of the manipulated file to the assigned computer;

switching a gateway setting to disconnect the manipulated computer from an external network and connect the assigned computer to the external network after the copying step.

2. The method according to claim 1, wherein the plural active computers receive processing requests via the external network, a management computer for performing system management, and a gateway for controlling connections of the active computers with the external network.

3. The method according to claim 2, wherein each of the active computers checks whether files held therein are manipulated, and copies the valid files to the assigned computer if at least one file therein is manipulated.

4. The method according to claim 2, wherein the management computer assigns at least one computer within the multiple computer system to substitute for the manipulated computer if at least one file therein is manipulated, notifies the manipulated computer of the assigned computer, copies backup files of the manipulated file to the assigned computer, and switches a gateway setting to disconnect the manipulated computer from the external network and connect the assigned computer to the external network.

5. The method according to claim 2, wherein:

the manipulated computer notifies the management computer of a storage destination of the backup file of the manipulated file, and the management computer reads the backup file from the storage destination to copy the backup file to the assigned computer.

6. The method according to claim 1, further comprising a step of periodically backing-up the registered files, wherein the manipulation checks are performed in a cycle shorter than a backing-up cycle of the copying step.

7. The method according to claim 2, wherein the management computer has a standby computer table recording at least one standby computer corresponding to each of the active computers such that the management computer assigns the standby computer accordingly in the assigning step.

8. The method according to claim 2, wherein the management computer, upon receipt of a request to assign a substitute computer from the manipulated computer, assigns any one standby computer to substitute for the manipulated computer.

9. The method according to claim 2, wherein the management computer, upon receipt of a request to assign a substitute computer from the manipulated computer, assigns an active computer with the least workload within the multiple computer system to substitute for the manipulated computer if there is no idle computer available.

10. The method according to claim 1, wherein the registering step involves registering the files to be subjected to the manipulation checks in groups such that back-up files of files of one group with the manipulated file are copied to the assigned computer together and files of different groups from the group including the manipulated file are determined as valid files to be copied to the assigned computer.

11. The method according to claim 10, wherein the groups are identified by different users such that files of one user are identified as in one user group.

12. The method according to claim 10, wherein the groups are identified by webpages such that files of one webpage are identified as in one webpage group.

13. The method according to claim 1, wherein the external network is Internet.

14. A system for detecting and disconnecting at least one manipulated computer among plural active computers within a multiple computer system thereby continuing processing therein, comprising:

a plurality of computers including the active computers and a management computer for performing system management; and a gateway for controlling connections of the active computers with an external network, wherein each of the active computers checks whether files held therein are manipulated, and copies valid files to an assigned computer if at least one file therein is manipulated, and the management computer assigns at least one computer within the multiple computer system to substitute for the manipulated computer if at least one file therein is manipulated, notifies the manipulated computer of the assigned computer, copies backup files of the manipulated file to the assigned computer, and switches a gateway setting to disconnect the manipulated computer from the external network and connect the assigned computer to the external network.

15. The system according to claim 14, wherein:

the manipulated computer notifies the management computer of a storage destination of the backup file of the manipulated file, and the management computer reads the backup file from the storage destination to copy the backup file to the assigned computer.

16. The system according to claim 14, wherein the management computer has a standby computer table recording at least one standby computer corresponding to each of the active computers such that the management computer assigns the standby computer accordingly.

17. The system according to claim 14, wherein the external network is Internet.

18. A computer software program stored in a multiple computer system for detecting and disconnecting at least one manipulated computer among plural active computers within a multiple computer system thereby continuing processing therein, comprising:

a registering module for registering files to be subjected to manipulation checks;

a manipulation checking module for performing the manipulation checks for the files and recording results of the manipulation checks;

an assigning module for assigning at least one computer within the multiple computer system to substitute for the manipulated computer if at least one file therein is manipulated according to the results of the manipulation checks;

a notifying module for notifying the manipulated computer of the assigned computer; and a copying module for copying valid files determined to be not manipulated to the assigned computer and for copying a backup file of the manipulated file to the assigned computer;

a switching module for switching a gateway setting to disconnect the manipulated computer from an external network and connect the assigned computer to the external network after the copying module finished the copying.

19. The computer software program according to claim 18, further comprising a backing-up module for periodically backing-up the registered files, wherein the manipulation checks are performed in a cycle shorter than a backing-up cycle.

20. The computer software program according to claim 18, wherein the registering module registers the files to be subjected to the manipulation checks in groups such that back-up files of files of one group with the manipulated file are copied to the assigned computer together and files of different groups from the group including the manipulated file are determined as valid files to be copied to the assigned computer.

* * * * *